G. W. BOWERS.
TEST INDICATOR.
APPLICATION FILED MAY 25, 1911.

1,001,121.

Patented Aug. 22, 1911.

Witnesses:
P. W. Pezzetti
E. Batchelder

Inventor:
George W. Bowers
by Knight Brown Quimby May
atty.

UNITED STATES PATENT OFFICE.

GEORGE W. BOWERS, OF SOMERVILLE, MASSACHUSETTS, ASSIGNOR TO AMERICAN WATCH TOOL COMPANY, OF WALTHAM, MASSACHUSETTS, A CORPORATION OF MASSACHUSETTS.

TEST-INDICATOR.

1,001,121.  Specification of Letters Patent.  Patented Aug. 22, 1911.

Application filed May 25, 1911. Serial No. 629,495.

*To all whom it may concern:*

Be it known that I, GEORGE W. BOWERS, a citizen of the United States, and a resident of Somerville, in the county of Middlesex and State of Massachusetts, have invented certain new and useful Improvements in Test-Indicators, of which the following is a specification.

This invention relates to indicators adapted for use in connection with lathes, planers, surface plate work, etc., to indicate irregularities in the surfaces of work when such irregularities are too minute to be visible to the eye, indicators of the class to which my invention relates being provided with projecting contact pieces adapted to contact with the surfaces to be tested, and with pointers coöperating with graduated scales and connected with the contact pieces through suitable motion-multiplying mechanism, so that a slight movement of the contact piece of an indicator, due to the irregularities in the surfaces being tested, will cause a movement of the pointer of sufficient amplitude to indicate clearly the extent of the defect.

The invention has for its object to provide a simple, durable and efficient indicator of the class above referred to, the parts of the indicator being few in number and of simple construction.

The invention consists in the improvements which I will now proceed to describe and claim.

Figure 1:
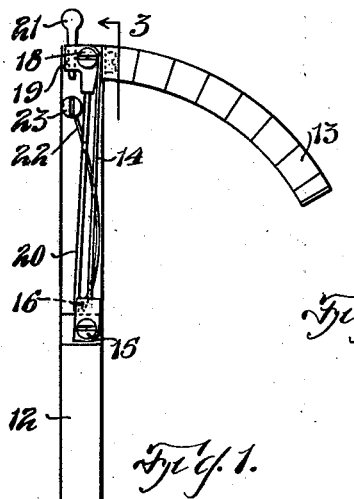
Figure 3:
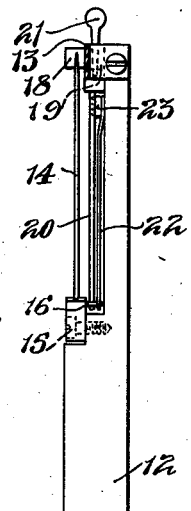
Figure 2:
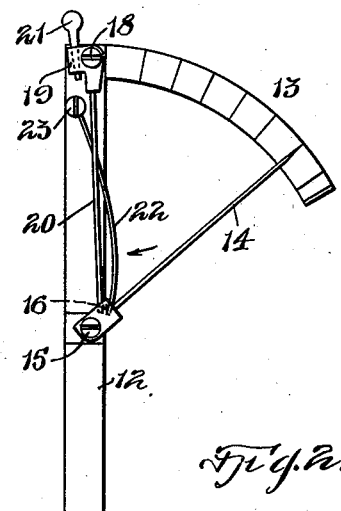
Figure 4:
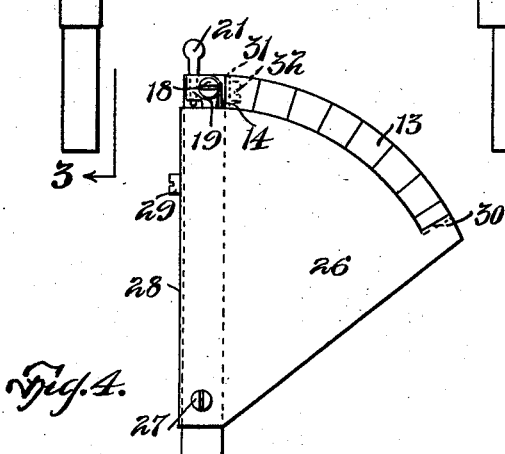
Figure 5:
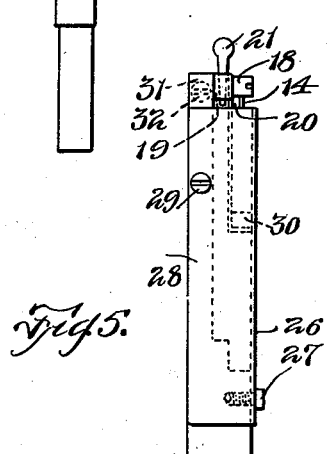
Figure 6:
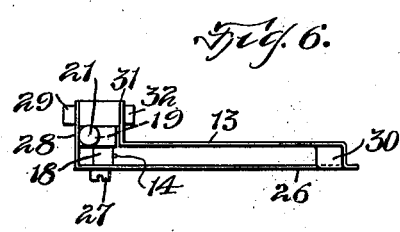

Of the accompanying drawings which form a part of this specification,—Figure 1 represents a plan view of an indicator embodying my invention, the movable parts of the indicator being in their normal positions, and the pointer in its initial position relatively to the scale; Fig. 2 represents a view similar to Fig. 1 showing the movable parts of the indicator displaced from their normal positions; Fig. 3 represents a section on line 3—3 of Fig. 1, and an elevation of the parts at the left of said line. (The guard hereinafter referred to is omitted from Figs. 1, 2 and 3). Fig. 4 represents a plan view showing a guard applied to the indicator; Fig. 5 represents an edge view, and Fig. 6 represents an end view showing the indicator and guard.

Similar reference characters indicate the same or similar parts in all the figures.

In the drawings,—12 represents an elongated slender rod or shank which is preferably rectangular in cross section and is adapted to be secured in a suitable holder, such as a tool post of a lathe, where the shank may take the place of a turning tool or other tool commonly carried by a tool post. It will be understood, however, that the shank 12 may be supported in suitable relation to the work to be tested, by any other means. To the outer end of the shank 12 is attached a segmental scale plate 13 which is suitably graduated to coöperate with the pointer hereinafter described.

14 represents a pointer which is a slender, elongated rod or needle preferably enlarged at its inner end to engage a pivot pin 15, said pin being attached to the shank 12 and constituting the center on which the pointer is adapted to oscillate, the outer end of the pointer being movable over the scale plate 13.

16 represents a stud projecting from the inner side of the pointer 14 near the pivot 15 thereof, said stud being separated from the pivot by a distance which is a very small fraction of the entire length of the pointer, as shown by Figs. 1 and 2.

To the outer end of the shank 12 is connected by a pivot pin 18 a bell crank lever having a short arm 19 extending crosswise of the shank 12, and a long arm 20 extending lengthwise of said shank, the length of the short arm being very much less than that of the long arm 20, as shown. To the short arm 19 is secured an outwardly projecting contact piece 21 which may be a pin having a close fit in a tapered orifice in the arm 19, provision being thus made for detachably securing the contact piece to the arm so that contact pieces of different sizes and shapes may be used interchangeably. The long arm 20 bears at a point near its outer end on the stud 16.

22 represents a spring which is preferably a practically straight piece of resilient wire attached at one end to a post 23 on the shank 12, its free end bearing on the stud 16.

It will be seen by reference to Figs. 1 and 2 that the lever arm 20 and spring 22 bear on opposite sides of the stud 16, the arrangement being such that the spring 22, which is under tension causing it to exert pressure in the direction of the arrow in Fig. 2, holds the pointer normally in its initial position relatively to the scale, as indicated by Fig. 1, against a fixed stop on the shank 12. Said stop, which is preferably the head of the pivot pin 18, is so arranged that when the lever arm 20 bears against it, the said lever arm and the contact piece 21 are in their normal position, the contact piece being at its maximum projection from the end of the shank 12.

It will now be seen that when the shank 12 is mounted on a tool post or other suitable support, and is adjusted so as to bring the contact piece 21 within the path of a slight projection or irregularity on a rotating piece of work, the said projection will slightly displace the contact piece inwardly, thus giving the bell crank lever a slight turning movement on its pivot. This movement is imparted by the lever arm 20 through the stud 16 to the pointer, and is reproduced in greatly multiplied form at the outer end of the pointer, the movement of which is several hundred times greater than the movement of the contact piece 21. When the displacing pressure is removed from the contact piece 21, the spring 22 acts to return both the pointer and the bell crank lever and contact piece to their normal positions, these being determined by the stop 18.

In Figs. 4, 5, and 6, I show the indicator composed of a sheet metal plate having a flat body portion 26 attached at one end to the shank by a screw 27, and a flange 28 which is attached to the shank by a screw 29. The body portion 26 has a segmental outer end which is parallel with the inner edge of the scale 13. The outer end of the pointer projects beyond the outer end of the guard and is therefore exposed, the main portion of the pointer being protected by the guard. The lever arm 20 and the spring 22 are also protected by the guard.

The guard and the scale 13 are preferably integral and formed from a single blank, the outer end of the scale being connected with the body portion of the guard by a bent neck 30. The inner end of the scale is bent to form an ear 31, which is attached to the shank by a screw 32.

I claim:

1. A test indicator comprising an elongated shank adapted to be secured to a tool post or other support, and provided at its outer end with a graduated scale, a pointer pivoted at its inner end to the shank and movable over the scale, the pointer being provided with a stud located at a point near the pivot, a bell crank lever pivoted to the outer end portion of the shank and having a short arm extending crosswise of the shank and carrying an outwardly projecting contact piece, and a long arm extending lengthwise of the shank and bearing on one side of the stud, a spring attached at one end to the shank and bearing on the opposite side of the stud, and a stop on the shank adapted to arrest the pointer against movement in one direction and determine the normal position of the lever, its contact piece, and the pointer, the lever being adapted, when displaced from its normal position, to move the pointer outwardly over the scale.

2. A test indicator comprising an elongated shank adapted to be secured to a tool post or other support, and provided at its outer end with a graduated scale, a pointer pivoted at its inner end to the shank and movable over the scale, a bell crank lever pivoted to the outer end portion of the shank and having a short arm extending crosswise of the shank and carrying an outwardly projecting contact piece, and a long arm extending lengthwise of the shank and bearing on the inner side of the inner stud, a spring carried by the shank and adapted to move the pointer and lever to their normal positions, and a guard attached to the shank and formed to protect the pointer, the longer lever arm, and the spring, and to expose the outer end of the pointer.

3. A test indicator comprising an elongated shank adapted to be secured to a tool post or other support, a pointer pivoted at its inner end to the shank and adapted to swing outwardly from one side of the shank, a bell crank lever pivoted to the outer end portion of the shank and having a short arm extending crosswise of the shank and carrying an outwardly projecting contact piece, and a long arm extending lengthwise of the shank and bearing on the inner side of the inner stud, a spring carried by the shank and adapted to move the pointer and lever to their normal positions, a sheet metal guard attached to the shank and composed of a body portion formed to cover the main portion of the pointer, the longer arm of the lever, and the spring, and to expose the outer end of the pointer, and a flange bearing on the shank, said body portion projecting from one side of the shank, and a segmental sheet metal scale integral with the guard and connected at one end with the body portion thereof by an inwardly bent neck, the other end of the scale having an ear attached to the shank.

In testimony whereof I have affixed my signature, in presence of two witnesses.

GEORGE W. BOWERS.

Witnesses:
  C. F. Brown,
  P. W. Pezzetti.

---

Copies of this patent may be obtained for five cents each, by addressing the "Commissioner of Patents, Washington, D. C."